No. 888,866. PATENTED MAY 26, 1908.
J. M. BOYD.
SLING PULLEY.
APPLICATION FILED APR. 15, 1904.

2 SHEETS—SHEET 1.

WITNESSES:
Rob't H. Crosby.
M. M. Finnegan.

INVENTOR:
John M. Boyd.

No. 888,866. PATENTED MAY 26, 1908.
J. M. BOYD.
SLING PULLEY.
APPLICATION FILED APR. 15, 1904.

2 SHEETS—SHEET 2.

WITNESSES:
Robt H Crosby
M. M. Finnegan

INVENTOR:
John M. Boyd.

UNITED STATES PATENT OFFICE.

JOHN M. BOYD, OF FOND DU LAC, WISCONSIN.

SLING-PULLEY.

No. 888,866.  Specification of Letters Patent.  Patented May 26, 1908.

Application filed April 15, 1904. Serial No. 203,348.

*To all whom it may concern:*

Be it known that I, JOHN M. BOYD, a citizen of the United States, residing at Fond du Lac, in the county of Fond du Lac and State of Wisconsin, have invented certain new and useful Improvements in Sling-Pulleys, of which the following is a specification, such as will enable others skilled in the art to which it appertains to make and use the same, reference being had to the accompanying drawings, and to the letters and figures of reference marked thereon, which form a part of this specification.

My invention relates to improvements in pulleys adapted for use with a hay carrier, to gather up a load or loads at two different points at the same time, as two hay forks, or the opposite ends of a hay sling, using two pulleys on the same elevating rope, and has for its object to automatically connect the two pulleys as they come together, and to support them from the hay carrier after the load is raised, also to adapt them to be both attached to one fork or other object when desired, and used as a single pulley, and it consists in a yoke, or coupling attachment, carried by one pulley and adapted to couple with the other as the pulleys are drawn together and up to the hay carrier, running on the same rope, and provided with means to engage with and trip the hay carrier and hold the pulleys in connection therewith as the carrier runs off over the mow, also in different details of construction, and the combination of different parts, as hereinafter pointed out.

Figure 1:
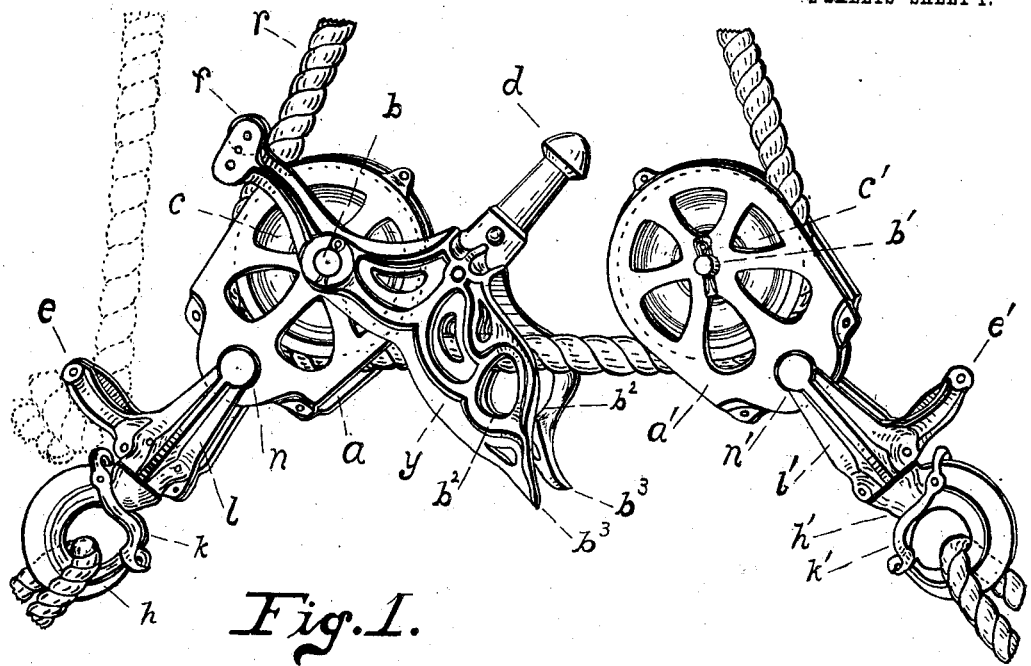
Figure 2:
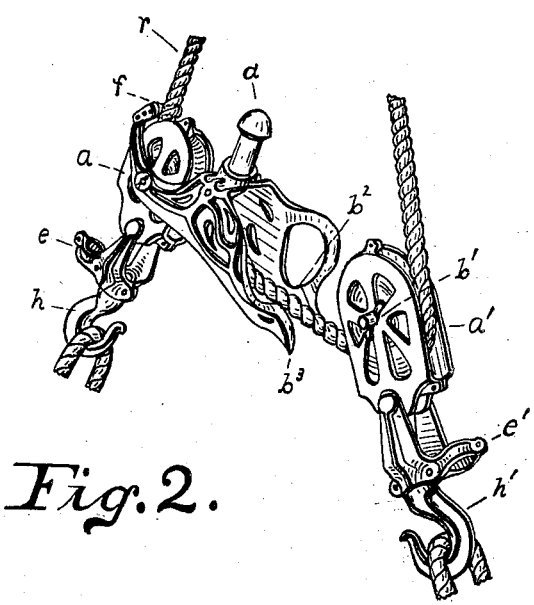
Figure 3:
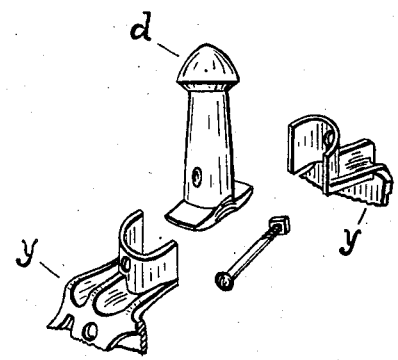
Figure 4:
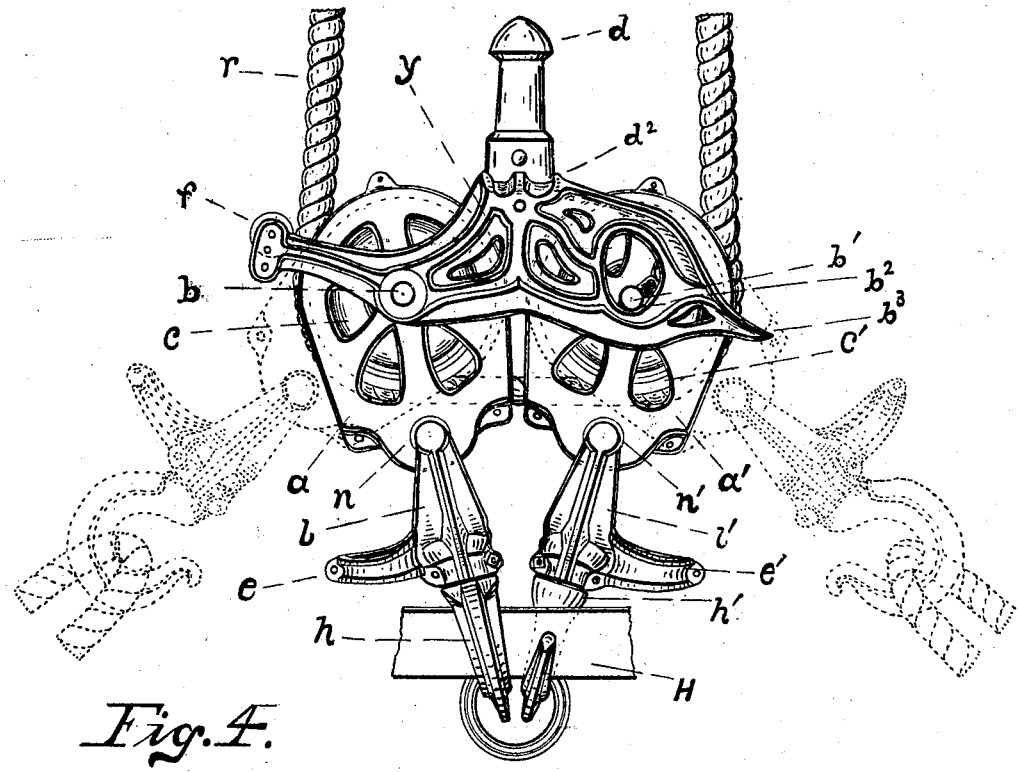
Figure 5:
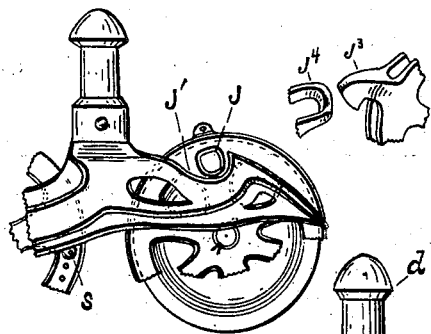
Figure 6:
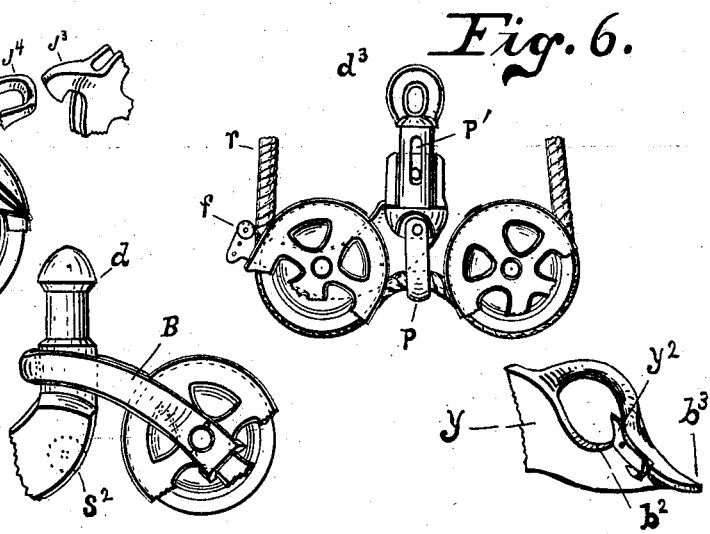

In the accompanying drawings, Figure 1, is a view from one side of the pulleys, showing them just as they are coming together, when hooked to the opposite ends of a sling, or other rope, and when compressing a load. Fig. 2, is a detail view of the same. Fig. 3, is a detail view of the registering head, and its sockets, or connecting parts at the upper edge of the sides of the yoke or coupling. Fig. 4, is a side elevation of the pulleys when coupled together, showing them in position, in full lines, as when both hooked to one fork-head, or other object, and in dotted lines, as when hooked to the opposite ends of a hay sling, or long rope, carrying a load compressed therein, in the ordinary manner, as will be understood, and Figs. 5, and 6, are views of modifications of different parts, as hereinafter pointed out.

In the drawings, in which similar letters of reference indicate corresponding parts, *a*, *a'*, are the main frames of the pulleys, carried by axles *b*, *b'*, of the pulley wheels or sheaves *c*, *c'*, traveling on the main elevating rope *r*, of the hay carrier in the ordinary manner. To the lower ends of these main pulley frames *a*, *a'*, are attached hooks *h*, *h'*, adapted to hook into the opposite ends of a hay sling, or into fork heads, etc., as desired, said hooks being preferably connected to said pulley frames by means of links or side arms, *l*, *l'*, pivoted to the lower ends of said frames, preferably by means of hooked extensions at their upper ends hooking into holes or openings *n*, *n'*, near the lower edge of each side of said frames, similar to the construction shown in the fork-pulley in my Patents Nos. 827,609 and 827,680, dated July 31, 1906, said hooks being also preferably, though not necessarily, provided with closing links *k*, *k'*, as shown also in above application, and the side arms or links *l*, *l'*, being preferably provided with loops or rings *e*, *e'*, to either of which one end of the elevating rope *r*, may be attached, as shown by dotted lines in Fig. 1, instead of to the hay carrier, when a triple tackle is desired, to give more power for raising heavy loads, said rope being released from said ring and the end with knot being allowed to run up to the hay carrier, in the usual manner, when only double tackle is desired, as will be readily understood, it being also understood that the carrier is provided with a pulley at each end, otherwise one end of draft rope would have to be made fast to the carrier and only double tackle could be used. The hooks being pivotally connected to said pulley frames may also be swung together to hook both into a fork-head H, as in Fig. 4, if it is desired to use a fork to take off the top of a load for instance, and then be spread apart to hook into the opposite ends of a sling, for cleaning up the bottom of the load for instance, as shown by dotted lines in the same figure, (or to hook into two forks, one near each end of the load,) without necessitating a change of pulleys upon the elevating rope, thus also adapting them for use for other purposes where frequent changes from a single to a double hitch to the load, or vice versa, may be desired, the main frames being also adapted to swing upon the axles of the pulley wheels or sheaves to come properly in line with the draft in either case as shown, and the rope being attached for either double or triple tackle as desired.

A yoke or coupling $y$, is also carried on the axle of one of the pulleys, resting astride the main frame and projecting out between the pulleys and on each side of the elevating rope, as shown, in such a position that the opposite pulley will run into it as the pulleys are drawn together, the rear or opposite end of said yoke or coupling being formed with arms or extensions carrying a small guide pulley or roller, $f$, adapted to bear against the draft or elevating rope as shown, to control the height at which the opposite or open end of the yoke or coupling is carried, and to prevent its dropping down too far, several holes being provided at the ends of said arms or extensions for the axle of said guide pulley or roller, as shown, for adjusting to hold the opposite or open end of the coupling at different heights, and according to the spread of the rope above the pulleys with different carriers, to couple properly with the opposite pulley, and to guide the trip or registering head $d$, attached to the upper side of said coupling, to properly enter the carrier as the load is raised, the axle $b'$ of the opposite pulley being extended out at each side of the pulley frame, as shown in Figs. 1 and 2, and the open end of the yoke or coupling being provided with inclined points or ends $b^3$, $b^3$, adapted to guide the axles $b'$, of said pulley into sockets or bearings $b^2$, in said coupling provided for the same.

The operation of the device is as follows; The pulleys being spread apart and the hooks $h$, $h'$, being hooked into opposite ends of the loaded sling in the usual manner, (or into the heads of two forks, or other objects,) and power being applied to the rope as usual, the pulleys will be drawn together, compressing the hay in the sling into a roll or bundle, and as the pulleys come together the free pulley will enter the open end of the yoke or coupling $y$, carried by the opposite pulley, as in Figs. 1, and 2, being guided by the elevating rope $r$, and the inclined points $b^3$, $b^3$, of said coupling, so that the extended ends of the axle $b'$, of the free pulley will ride over the upper ends of the inclines and drop behind them into the bearings or sockets $b^2$, $b^2$, as in Fig. 4, as the load is raised, and be held thereby, the yoke or coupling $y$, being brought up into proper position to engage the axle $b'$, as above, and to guide the registering head $d$, properly into the carrier, either by the contact of the upper end of the frame $a'$, of the free pulley with the upper part of the coupling, or lower headed end of the shank of the registering head $d$, as at $d^2$, or by the pressure of the elevating rope $r$, against the guide pulley or roller $f$, as will be understood, and as the registering head $d$, enters and trips the carrier, the grappling device in the carrier engages said head in the ordinary manner, which supports said pulleys and their load by means of the yoke or coupling attached thereto as the carrier runs off over the mow, where the load is discharged in the usual manner, and the carrier may be returned and the operation repeated, as will be readily understood.

It is evident that the hooks may be left open, as in Figs. 2, and 4, or be provided with closing links $k$, $k'$, as in Fig. 1, as desired, as heretofore mentioned, also that they may be otherwise attached if desired.

The registering head $d$, shown in detail in Fig. 3, is provided with a head, or side extensions, at the lower end of its shank as well as at the upper end, and is adapted to fit in sockets or bearings formed at the upper edge of the yoke or coupling, as shown, being held in place by a bolt, and may be changed to fit the carrier with which it is desired to use the pulleys, a loop $d^3$, at the upper end being used instead of the round head, as in Fig. 6, or a bail, or other desired construction, to correspond with the locking mechanism of the carrier.

Instead of the axles $a'$ of the free pulley being extended out at each side of the main frame to engage in a socket $b^2$, provided in the coupling, a lug or projection J, may be provided on the sides of the main frame, adapted to drop into a socket or recess J', formed at the upper edge of the coupling, as in Fig. 5, or a hooked extension may be formed on the free pulley frame, as at $J^3$, Fig. 5, adapted to hook over a bail or loop $J^4$, formed on the yoke or coupling, or a long bail may be provided for the free pulley, as at B, Fig. 5, adapted to catch over the head $d$, as the pulleys come together, as will be understood, or a loop may be attached to the lower end of the shank which carries the head or trip, as at P, Fig. 6, the draft rope $r$, being passed through said loop, and the shank which carries the head or trip being provided with a slot P', through which the retaining bolt passes, allowing said shank to slide up and down in its socket, to engage the rope $r$, by means of the loop P, when the head or trip $d^3$, has engaged with the carrier and the weight of load comes upon it and pulls it up, and so support the loose pulley, (which would be between the loop and the end of rope that was fast to the carrier,) or to allow it to slide down and release the rope, as it was disengaged from the carrier, as will be understood, or other means may be provided whereby the free pulley may be connected to or supported by the yoke or coupling, but I consider the device shown in Figs. 1, 2, and 4, as the most desirable form. (In these Figs. 5 and 6, only those parts deemed necessary to explain the modifications are shown, the rest being broken away, as will be understood.) A stop S, may also be attached to one side of the main frame of the pulley carrying the yoke or coupling, as in Fig. 5, to prevent the yoke or coupling dropping too far, and to form a guide therefor, instead of the guide roller $f$, Figs. 1, 2, 4, and 6, said stop S, being preferably adjustable at different points, by means of a bolt or pin or otherwise, different holes being provided therefor in the pulley frame if desired, or the stop may consist of a bolt formed with a large or elongated head adapted to engage with the under edge of the yoke or coupling, as will be understood, which bolt could be changed from one hole to another if desired, or a small roller could be provided inside the coupling, below the head, as at $S^2$, Fig. 5, shown in dotted lines, adapted to travel on the rope and prevent said head dropping too low, though the guide roller attached to the rear extension of the yoke or coupling, as at $f$, Figs. 1, 2, 4, and 6, is thought to be the most preferable form.

Should the axle $b'$, of the free pulley be inclined to slip out of its socket $b^2$, in the coupling, when under the strain of a lightly compressed sling, as shown by dotted lines in Fig. 4, a small dog or catch $y^2$, may be provided at the upper end of the incline back of the point $b^3$, of the coupling, as in Fig. 6, in which is shown one end of one side of the coupling $y$, with the catch $y^2$, pivoted at the upper end of the incline at the rear of the point $b^3$, so that the axle $b'$, of the free pulley can slide over it into the socket $b^2$, when the point of said dog or catch $y^2$, would fly up and prevent said axle from escaping, unless it was raised clear over said catch, or, if preferred, the socket $b^2$, may be made deeper, or the point over which the axle $b'$, must ride to enter said socket may be raised higher and made more hooked over the edge of the socket, as will be understood, to better retain the axle of said free pulley after it has once entered said socket.

It is also evident that other slight modifications may also be made without departing from the spirit of my invention, and I therefore wish it distinctly understood that I explicitly reserve to myself all such modifications, combinations, and arrangements of different parts, as properly come within the scope of my invention.

What I claim as my invention and desire to secure by Letters Patent, is—

1. In combination with two pulleys adapted to work on a single elevating rope, an independent yoke or coupling pivotally attached at the sides of the frame of one of said pulleys, and adapted to oscillate up and down in a limited space independent of said pulley frame, and to engage with the opposite pulley frame as the pulleys approach each other on the rope, substantially as and for the purposes set forth.

2. In combination with two pulleys adapted to work on a single elevating rope, a yoke or coupling pivotally connected at the sides of, and carried by one of said pulley frames, having a limited oscillating movement up and down thereon and adapted to couple with the other as they come in contact, and provided with a head or trip adapted to engage with the carrier and connect both pulleys therewith.

3. The combination of two pulleys adapted to work on a single draft rope, an independent yoke or coupling loosely connected to the sides of one of said pulley frames, having a limited oscillating movement up and down thereon and adapted to automatically couple the two pulleys together as they come in contact, and means attached to the upper edge of said coupling to engage with and trip the hay carrier, substantially as and for the purposes set forth.

4. In combination with two pulley blocks adapted to work upon a single elevating rope, a yoke or coupling adapted to be carried by one of the pulleys, being loosely connected thereto at each side of the pulley frame with its main or coupling part projected out ahead of the pulley block as it moves along the rope and adapted to couple with the other pulley block as they come in contact, means to trip the carrier and to automatically connect said coupling therewith, and means to automatically guide said coupling at the proper height to engage the opposite pulley as said pulleys come together, and to guide the tripping means to properly enter the carrier as the load is elevated, substantially as set forth.

5. In combination with two pulley blocks adapted to work upon a single elevating rope, a separate yoke or coupling carried by one of the pulley blocks having a forward extension adapted to couple with the other, and provided with a rear extension carrying a guide roller adapted to bear against the outer or rear side of the elevating rope to guide the coupling into proper position independent of the pulley frame as the load is elevated, substantially as and for the purposes set forth.

6. The combination of two pulleys adapted to travel upon a single elevating rope, a yoke or coupling pivoted upon the axle of one of said pulleys, being carried astride the frame of said pulley and projected out ahead of the same and toward the other pulley, said projecting end being open to receive the opposite pulley as they come together, and provided with sockets or recesses to receive the extended ends of the axle of said pulley and support the same, and means whereby said yoke or coupling may engage with the hay carrier to support both pulleys after the load has been elevated, substantially as and for the purposes set forth.

7. The combination of two pulleys adapted to travel on a single draft rope, a yoke or coupling attached to the axle of one of said pulleys, being carried astride the frame of said pulley and with its forward or open end projected out and down astride the draft rope toward the opposite pulley in proper position for said pulley to run into it, a guide roller journaled in the rear extension of said yoke or coupling at the opposite side of the pulley by which it is carried, and adapted to bear against the draft rope to hold said coupling in proper position to engage the opposite pulley as they come together, means in said coupling to engage and hold said opposite pulley, and means to engage with the hay carrier, substantially as and for the purposes set forth.

8. The combination of two pulleys adapted to travel on a single elevating rope, a yoke or coupling carried by one of said pulleys and adapted to couple with the other as the pulleys come together, and provided with means to engage with the hay carrier, and suitable hooks pivotally connected to the sides of the frames of said pulleys and adapted to be swung together to hook into a single forkhead or other object, substantially as and for the purposes set forth.

9. The combination with two pulley blocks adapted to work upon a single elevating rope, and provided with means whereby the load may be attached, of separate means pivotally connected at the sides of one of said pulley frames, having a vertically oscillating movement thereon, and adapted to automatically engage with and trip the carrier, and support both pulleys as the carrier runs off over the mow, substantially as and for the purposes set forth.

10. The combination of two pulleys adapted to work on a single elevating rope, hooks pivotally connected to the lower sides of their frames, and means carried astride the frame of one pulley, and adapted to engage with and trip the carrier as the load is raised, and to support both pulleys as the carrier runs off over the mow, substantially as and for the purposes set forth.

11. The combination of the elevating rope, two pulley blocks adapted to travel upon the same, and means separate from the frames of said pulleys, but loosely connected at the sides thereof, whereby said pulley blocks may be connected at each side of their frames, and supported from the carrier independent of said elevating rope after the load has been elevated.

12. The combination of the elevating rope, two pulleys adapted to travel upon said rope, and provided with hooks whereby loads may be attached to their frames, and means formed separate from their frames, but adapted to be connected at the sides thereof, whereby said pulleys and their loads may be supported independent of said rope after being elevated, and the pulleys and frames allowed to swing in their supports so that the hooks may be either brought together or spread out as desired, substantially as set forth.

13. The combination of the elevating or draft rope $r$, pulley frames $a$, $a'$, pulley wheels or sheaves $c$, $c'$, suitable hooks attached to the pulley frames, a yoke or coupling $y$, adapted to couple the pulleys together, and a removable trip or registering head $d$, attached to said coupling, substantially as and for the purposes set forth.

14. In combination with the two pulleys adapted to travel upon a single elevating rope, and provided with suitable frames having hooks attached, a yoke or coupling formed in two parts adapted to be carried at the sides of one of said pulleys and connected at their tops to a suitable trip adapted to engage with a hay carrier, substantially as and for the purposes set forth.

15. In combination with two pulleys adapted to travel upon a single elevating rope, a yoke or coupling formed in two pieces adapted to be carried at the sides of one of said pulleys and to couple with the other, and to be connected to a suitable guide at their rear whereby the height at which the opposite end of the coupling is carried may be controlled, substantially as and for the purposes set forth.

16. The combination of the rope $r$, pulley frames $a$, $a'$, wheels or sheaves $c$, $c'$, a yoke or coupling $y$, carried on the axle $b$, and provided with a socket or bearing $b^2$, near its opposite end, and the axle $b'$, extended out at each side of the pulley frame $a'$, and adapted to rest in said socket or bearing $b^2$, substantially as and for the purposes set forth.

17. In combination with the pulley frames $a$, $a'$, wheels or sheaves $c$, $c'$, and axles $b$, $b'$, the yoke or coupling $y$, pivoted upon the axle $b$, and provided with a socket or bearing $b^2$, for the axle $b'$, and an inclined point or guide $b^3$, at its forward end, and an extension at the opposite end carrying a guide roller $f$, substantially as and for the purposes set forth.

18. The combination of the rope $r$, pulley frames $a$, $a'$, wheels or sheaves $c$, $c'$, axles $b$, $b'$, and hooks $h$, $h'$, connected to the pulley frames $a$, $a'$, by means of side arms or links $l$, $l'$, and the yoke or coupling $y$, provided with sockets $b^2$, inclined points or guides $b^3$, guide roller $f$, and registering head or trip $d$, substantially as and for the purposes set forth.

In testimony whereof I have signed my name to this specification in the presence of two subscribing witnesses, this 29th day of March 1904.

JOHN M. BOYD.

Witnesses:
ROBT. H. CROSBY,
M. M. FINNEGAN.